United States Patent
Mencarelli

[15] 3,677,514
[45] July 18, 1972

[54] BALL VALVE

[72] Inventor: Vittorio Mencarelli, Viale Monza, 16, Milan, Italy

[22] Filed: Feb. 24, 1971

[21] Appl. No.: 118,347

[30] Foreign Application Priority Data

March 3, 1970 Italy ..................................21421 A/70
Feb. 11, 1971 Italy ..................................20418 A/71

[52] U.S. Cl. .....................251/148, 251/174, 251/214, 251/288, 251/315, 251/317, 251/367
[51] Int. Cl. ................................................F16K 5/02
[58] Field of Search.................251/148, 170, 171, 174, 214, 251/288, 314, 315, 316, 317, 367

[56] References Cited

UNITED STATES PATENTS

| | | | |
|---|---|---|---|
| 3,056,576 | 10/1962 | Kulisek | 251/317 X |
| 3,260,497 | 7/1966 | Blackford | 251/288 X |
| 3,367,359 | 2/1968 | Johnson | 251/315 X |
| 3,494,590 | 2/1970 | Enssle | 251/367 X |
| 3,531,081 | 9/1970 | Scaramucci | 251/315 X |
| 3,567,176 | 3/1971 | Johnson | 251/174 |
| 3,584,833 | 6/1971 | Grenier | 251/315 X |

*Primary Examiner*—Harold W. Weakley
*Attorney*—Fleit, Gipple & Jacobson

[57] ABSTRACT

A ball valve of stamped plate, comprising a hollow valve body having fluid inlet and outlet, within said body a cylindrical band containing a hollow ball provided with two diametrically opposite apertures, said ball being rotatable according to an axis at right angles to the flow direction between open and closed positions, a ball control rod engaging said ball by its lower end and, in turn, being pivoted in a collar projecting from said cylindrical band, seals being interposed between said ball, cylindrical band and housing.

17 Claims, 7 Drawing Figures

Patented July 18, 1972
3,677,514
2 Sheets-Sheet 1
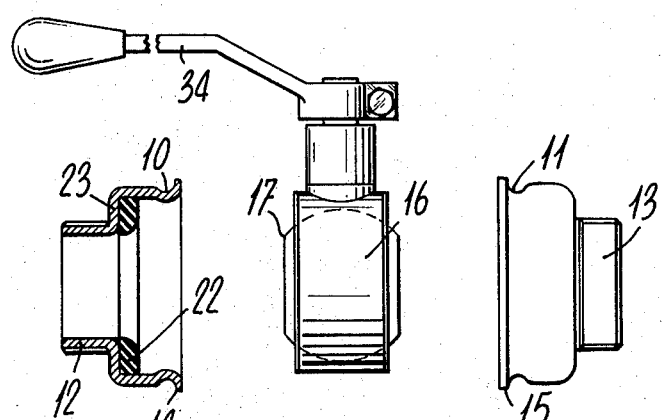
FIG. 1
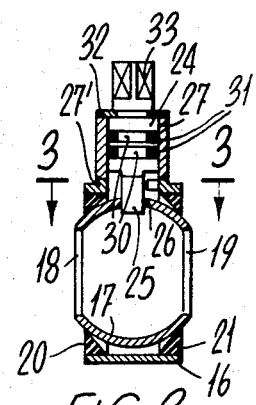
FIG. 2
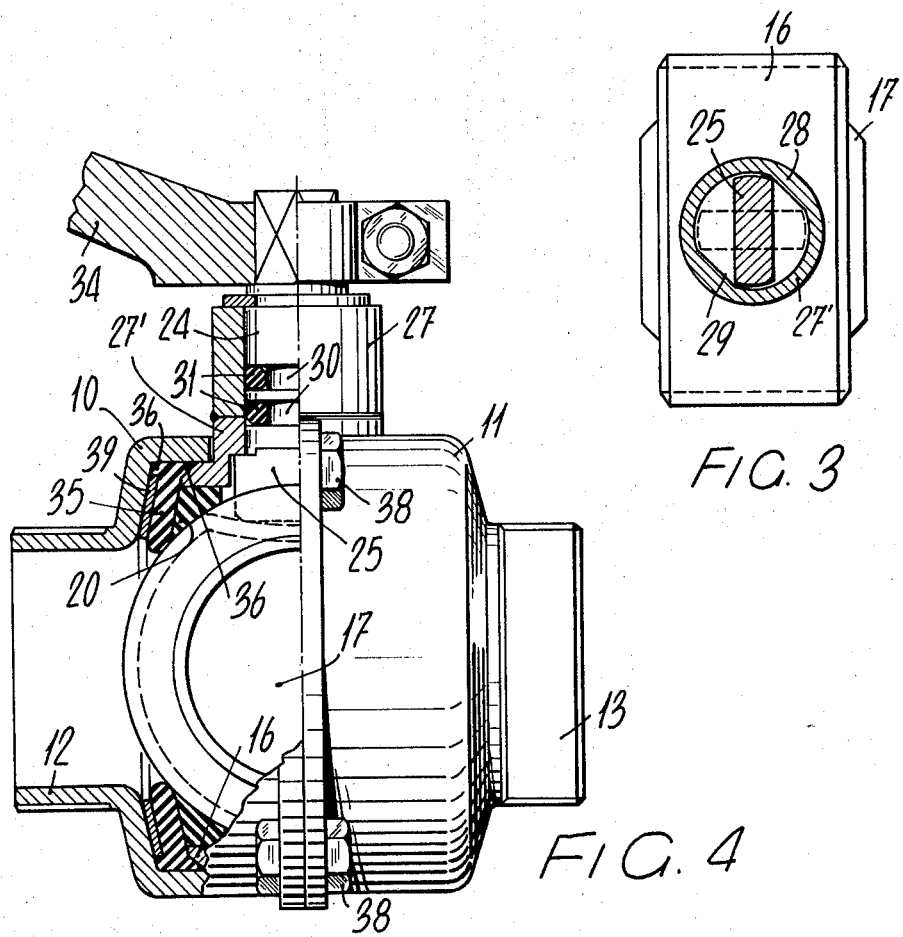
FIG. 3
FIG. 4
INVENTOR
Vittorio Mencarelli
BY Fleit, Gipple & Jacobson
ATTORNEYS Patented July 18, 1972
3,677,514
2 Sheets-Sheet 2
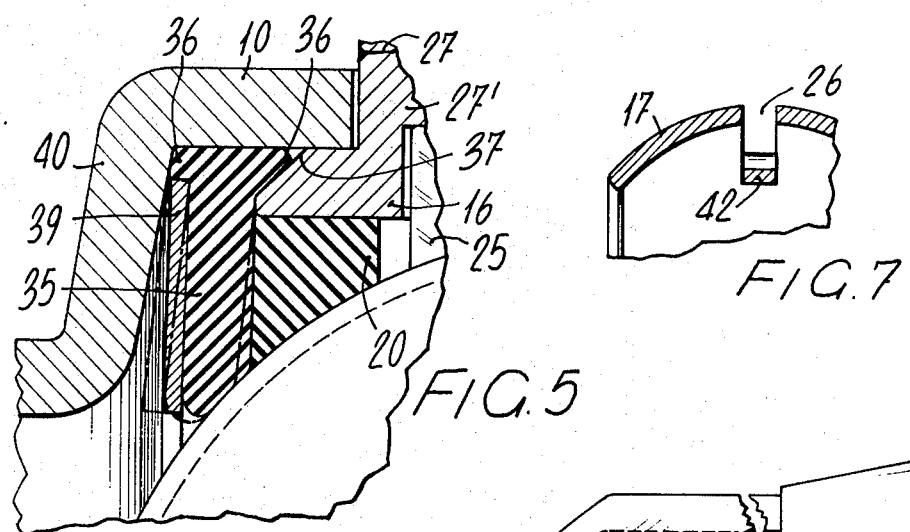
FIG.5
FIG.7
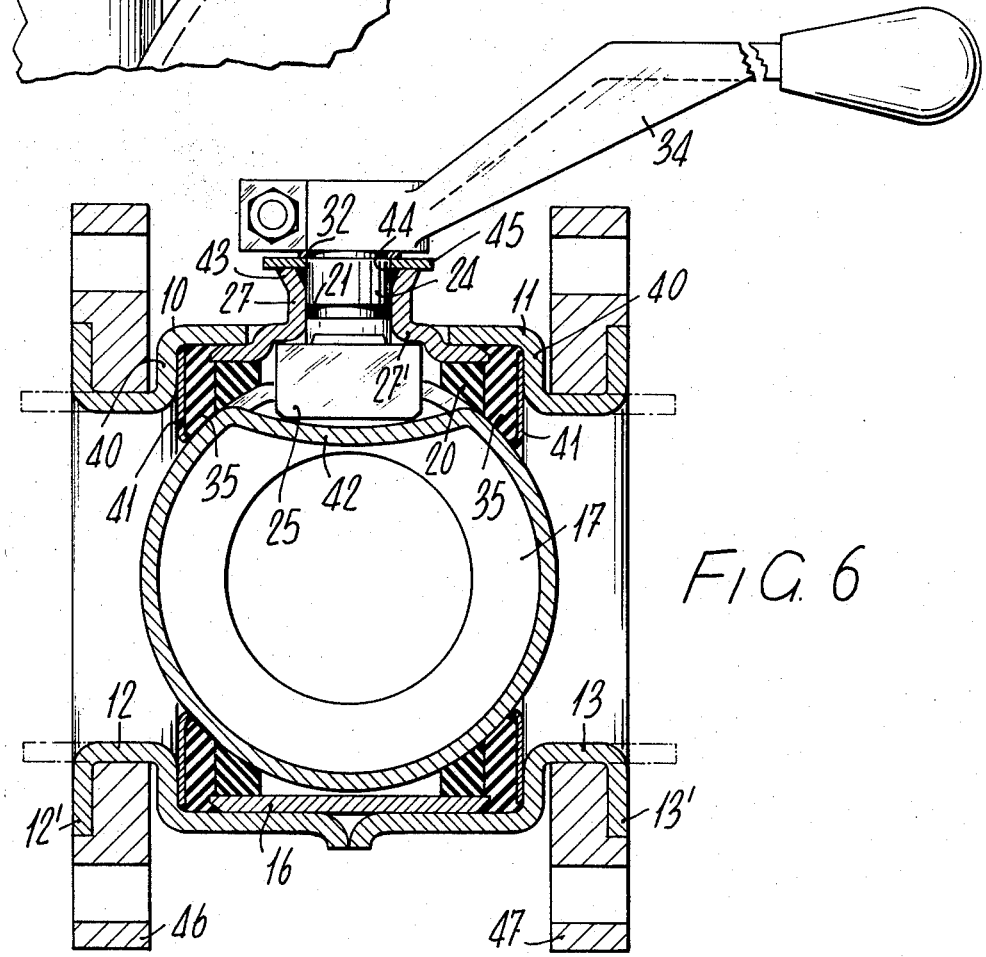
FIG.6
INVENTOR
Vittorio Mencarelli
BY Fleit, Gipple + Jacobson
ATTORNEYS

BALL VALVE

This invention generally relates to a ball valve, and more particularly a ball valve completely made of stamped plate, so as to substantially avoid any machining operation.

Ball valves are known which substantially comprise a valve body, wherein a seating has been provided for a ball having a diametrical cylindrical passage, the ball being rotatable between an open position and a closed or fluid intercepting position. However, conventional ball valves are obtained by machining cast pieces, or by machining stainless steel blocks. In either case, the machining processes require skilled labor and substantial time period. Additionally, such valves are of complex construction, heavy and involve a substantial waste of material due to unavoidable machine shop rejection.

Finally, cast pieces or pieces from blocks are of low quality material as having some porosity or number of impurities.

Accordingly, the object of the present invention is to provide a ball valve, substantially minimizing or possibly removing the above mentioned disadvantages as completely produced from metal plate stamping, thus avoiding or minimizing machining operations.

Another object of the present invention is to provide a ball valve, wherein the fluid contacting parts are of valuable material, such as a plate as compared with cast pieces, in that in addition to having higher chemical and physical features a plate retains such features also after stamping, thus rendering a valve suitable to intercept any fluids.

A further object of the present invention is to provide a ball valve of stamped plate, the cost of which is substantially lower than that for valves provided by conventional methods, both for less use and waste of material, and for readiness in manufacturing and assembly of the valve.

According to the invention, a ball valve of stamped plate comprises a hollow valve body having a fluid inlet and outlet, a cylindrical band inside said body containing a hollow ball with two diametrically opposite apertures, said ball being rotable according to an axis at right angles to the flow direction between an open position and a closed position; a ball control rod engaging by its lower end with said ball and, in turn, being pivoted in a collar projecting from said cylindrical band, seals being interposed between said ball, cylindrical band and housing.

The invention will be more fully described in the following with reference to the appended drawings, in which:

FIG. 1 is a partly sectional, exploded view showing a ball valve according to the invention;

FIG. 2 is a longitudinal section showing the interior of the valve in FIG. 1;

FIG. 3 is a sectional view taken on line 3—3 in FIG. 2;

FIG. 4 is a partly sectional, side view showing a modified valve;

FIG. 5 is an enlarged sectional view showing a detail of the valve in FIG. 4;

FIG. 6 is a longitudinal sectional view showing a further improved valve according to the invention; and FIG. 7 is a partly sectional view of the ball taken on plane normal to that in FIG. 6.

Referring now to FIGS. 1–3, it will be seen that the ball valve according to the invention substantially comprises a hollow outer body of stamped plate, which is divided into two cylindrical caps 10 and 11 according to a plane of symmetry at right angles to the flow direction. At one end, each of said caps have a cylindrical connection 12 and 13, respectively, defining a passage for the fluid, at the other end thereof having an outward facing peripheral flange 14, 15 provided with apertures for assembling bolts passing therethrough, as shown by way of example in FIG. 4.

Within the valve body 10, 11 there is a ring or cylindrical band 16, wherein a sealing ball 17 is accomodated and rorable, this sealing ball 17 being internally hollow and made of stamped plate, as well as the above mentioned cylindrical band 16. Said ball 17 has two diametrically opposite passages 18, 19 for fluid passage therethrough, as clearly shown in FIG. 2.

Within said band 16, the ball 17 is supported by a pair of centering and thrust seals 20, 21 which are positioned at the ends of said cylindrical band and cooperate with further seals 22 (only one of which shown in FIG. 1) respectively interposed between the end of band 16 and a corresponding shoulder 23 on said valve body in order to provide for a sealing.

Said ball 17 can be rotated by about 90° from an open position shown in FIGS. 1 and 2 to a closed position, at right angles to the former position, by means of an operating or control rod 24, the lower flat portion 25 of which engages in a corresponding slit 26 provided, for example by milling, on the top ball portion. Said operating rod 24 is pivoted in a collar 27 attached to said band 16, this collar having its cylindrical top portion which, in the example of FIG. 2, is welded to a lower portion 27' obtained by stamping or extrusion from said cylindrical band 16.

As shown in FIG. 3, this lower portion 27' of the pivoting collar for the operating rod is of an inner profile having two sections in the form of an arc of a circle, between which are interposed two parallel straight sections 28 and 29, inclined by 45° relative to the axis of the cylindrical band 16 corresponding to the fluid flow direction to form two stop positions which are angularly spaced apart from each other by about 90° for the lower portion 25 of said operating rod 24, as clearly shown in FIG. 3 by full lines and by broken lines. Thus, said operating rod and hence said ball 17 can be rotated between two positions at 90° to each other, according to an axis at right angles to the flow direction.

The operating rod 24 also has one or more circumferential seatings 30 (FIG. 2), wherein toroidal sealings 31 are accomodated, a safety washer 32 outwardly engaging the operating rod, the latter also having at its outer end a square seat 33 for engaging a control handle 34 which is removably secured.

In FIG. 1 of the appended drawings, it will be seen that said connections 12 and 13 have an outer threading, but it is apparent that this threading could be provided also internally of the connections and, if desired, this threading could also be omitted where the valve is secured, for example, by welding or flanges, as it will be explained in the following.

Referring to FIGS. 4 and 5 of the appended drawings, a ball valve is shown therein, made of stamped plate as previously described and embodying some improvements.

In these figures the same reference numerals have been used for those parts which have remained substantially unchanged, whereas different reference numerals have been used for the modified parts.

In the example of FIGS. 4 and 5 the improvements are particularly concerned with the annular seal interposed between the cylindrical and 16 and valve body 10, 11.

As it will be seen in FIG. 4, and more particularly from the enlarged sectional view in FIG. 5, the ring-shaped seal 35, extending by its inner edge until contacting the outer surface of ball 17, has at its outer edge, and at least on one of its faces, but preferably on both faces, a projecting annular rib 36 cooperating with an inclined plane 37 (Clearly shown in FIG. 5) on the corresponding end of the cylindrical band 16 to form an outward sealing. Thus, as shown in FIG. 4, when the valve is assembled and the two outer caps 10, 11 are clamped to each other by bolts 48, the rib 36 contacting the inclined plane 37 will flatten against the latter forming a fluid seal.

On the outer face, or opposite face, of seal 35 a metal thrust ring or resilient washer 39 is applied, thus being interposed between said seal 35 and shoulder 40 on the corresponding cap of the valve body.

This washer 39 acts as a spring and during assembly is preloaded to urge said seal 35 to constantly adhere against the outer surface of ball 17, thus allowing for a sealing having a constant wear equalization.

Moreover, said seal 35 is a double-face seal, so that it can be turned over and re-used.

In order to allow for application of said thrust washer 39, the shoulder 40 of each cap has been slightly dished or flared to the outside with a taper ratio of a few tenths of millimeter in order to enable said washer 39 to bend sidewise during assembly under the thrust of ball 17, as shown by broken lines in FIG. 5, to provide a pre-load to the washer which during the use of the ball valve allows for constant equalization of the seal wear, as above stated. In FIG. 5, by broken lines there is shown the starting position for the washer and seal, whereas by full lines the position is shown after wearing of said seal 35.

Referring to FIGS. 6 and 7, further modifications will be described for the ball valve according to the invention. Also in this case, those parts which have remained substantially unchanged with respect to the preceding examples, have been designated by the same reference numerals, while new reference numerals have been used for the modified elements.

As shown in FIG. 6, in this case the metal washer 41, interposed between the seal 35 and shoulder 40 on the valve body, extends with its suitably curved inner edge to graze the outer surface of said ball 17. In addition to acting as a support and thrust for the seal, this spring washer 41 serves, in the event of fire of partial destruction of seal 35, which is of synthetic material, to provide some safety sealing.

As above mentioned, the rotation of ball 17 between its open and closed positions is effected by the operating rod 24, the flat lower portion 25 of which inserts in a slit in said ball 17. In the case of FIG. 6, this slit has been provided by blanking and dishing from said ball, with the portion of dished material 42 remaining inside the ball and under the end 25 of the operating rod forming a bridge-like structure which prevents an inward casual fall of said rod, such as may occur during assembling and prior to application of the fastening washer 32. Moreover, this bridge-like structure of dished material 42 coacts to reduce the weakening of said ball.

As above stated, in order that the operating rod may rotate between two positions at 90°, the lower portion 27' of collar 27 has two parallel straight sections. However, in the preceding case, only the lower portion 27' of the collar was made by extrusion stamping from the cylindrical band 16.

On the contrary in the case of FIG. 6, it will be seen that whole collar 27 has been made by extrusion stamping from the cylindrical band 16, with the lower portion 27' of a larger diameter having a cross-section as shown in FIG. 3, while the upper pivoting portion for the operating rod 24 is completely cylindrical. Furthermore as it will be seen in FIG. 6, at the upper edge 43 said collar has been outward enlarged or flared to form the seating for accomodating an asbestos seal 44 assuring some safety sealing also in the event the inner toroidal seals on the operating rod should be burnt or partially destroyed in case of fire or very high temperatures. A washer 45, located at the top of the gate, prevents said asbestos seal 44 from coming out of its seat.

As well known and above stated, this type of valves can be screwed, or welded or flanged to pipelines. In order to provide for flanging the valve according to the invention, it has been thought of fitting the connection 12 of the valve body with suitable circular flanges 46, 47 having holes for the passage of bolts therethrough, as clearly shown in FIG. 6. The fastening of flange 46 and 47 is effected by threading said flanges in the associated connections 12 and 13, having the ends 12' and 13' thereof as shown by broken line in FIG. 6; after said flanges 46 and 47 have been threaded, the connection ends 12' and 13' are outward bent over so as to form a U-seating for securing said flanges 46 and 47 in position. Thus, sufficiently rugged flanges can be obtained for the valve fastening, without having to resort to welds or threadings involving more expensive operations and it is also possible to use material of a lower cost for forming the flanges, while having valuable material, such as the plate of the valve body, contacting the fluid.

From the foregoing description and as above shown, it will be appreciated that a ball valve has been provided which is completely or almost completely made of stamped plate, thus substantially reducing the processing costs, the weight of the valve, the waste of material and also enabling to have valves with chemical and physical features by far superior than those commercially available at present.

What is claimed is:

1. A ball valve of stamped plate, comprising a hollow valve body having fluid inlet and outlet, within said body a cylindrical band containing a hollow ball provided with two diametrically opposite apertures, said ball being rotatable according to an axis at right angles to the flow direction between open and closed positions, a ball control rod engaging said ball by its lower end and, in turn, being pivoted in a collar projecting from said cylindrical band, seals being interposed between said ball, cylindrical band and housing.

2. A ball valve as claimed in claim 1, wherein said ball can be rotated by about 90°, said operating rod having a flat inner end with rounded edges and cooperating with a lower portion of the pivoting collar having a partially cylindrical inner profile with two opposite straight sections, the latter being inclined by 45° relative to the axis of said cylindrical band to define two stop positions for said operating rod which are angularly spaced apart by about 90°.

3. A ball valve as claimed in claim 2, wherein said flat inner end of the operating rod engages in a corresponding slit in said ball.

4. A ball valve as claimed in claim 3, wherein said slit is provided by milling.

5. A ball valve as claimed in claim 3, wherein said slit is provided by blanking and dishing, the blanked and dished portion remaining fast with the ball and below said slit.

6. A ball valve as claimed in claim 2, wherein the lower portion of said collar is integral and provided by extrusion stamping from said cylindrical band, the remaining portion of the collar being cylindrical and attached by welding to the underlying portion.

7. A ball valve as claimed in claim 2, wherein said collar is fast with said cylindrical band, said collar being provided by extrusion stamping from said cylindrical band with a lower portion of said collar having a larger diameter than the remaining cylindrical portion and having said partially cylindrical inner profile.

8. A ball valve as claimed in claim 1, wherein said collar has its endmost edge outward enlarged or flared to form the housing seating for a toroidal asbestos seal suitable to provide a safety sealing.

9. A ball valve as claimed in claim 1, wherein said operating rod is provided with at least one circumferential seating for accomodating a toroidal seal.

10. A ball valve as claimed in claim 1, wherein said hollow body of stamped plate is divided into two symmetrical cylindrical caps according to a plane at right angles to the flow direction, each of said caps being provided with an outer peripheral flange having holes for the passage of assembling bolts therethrough.

11. A ball valve as claimed in claim 1, wherein a first thrust ring seal is interposed between said ball and each end of said cylindrical band, and between each end of said band and a corresponding opposite shoulder on said valve body there being interposed a second ring seal extending to contact the outer surface of the ball.

12. A ball valve as claimed in claim 11, wherein said second seal has a circumferential rib projecting at least on one side of the outer edge of said seal, said rib cooperating with an inclined surface on the corresponding end/edge of the cylindrical band to provide for an outward sealing.

13. A ball valve as claimed in claim 12, wherein said housing has a bearing conical shoulder for each of the seals, a resilient metal washer being interposed between said seal and shoulder and acting for maintaining said seal constantly adhering to the outer surface of the ball.

14. A ball valve as claimed in claim 13, wherein said metal washer extends by its inner edge to graze said outer surface of the ball.

15. A ball valve as claimed in claim 1, wherein said body has a cylindrical connection at said inlet and outlet, each of said connections having an outer threading.

16. A ball valve as claimed in claim 1, wherein said body has a cylindrical connection at said inlet and outlet, each of said connections having an inner threading.

17. A ball valve as claimed in claim 1, wherein said body has a cylindrical connection at said inlet and outlet, a circular flange being threaded on each of said connections and the connection edge being outward turned over for securing said flange in position.

* * * * *